United States Patent
Breitenbach et al.

(10) Patent No.: US 9,702,491 B2
(45) Date of Patent: Jul. 11, 2017

(54) SCREW CONNECTION, IN PARTICULAR FOR A CLAMP, AND CLAMP

(71) Applicant: NORMA GERMANY GMBH, Maintal (DE)

(72) Inventors: Gerrit V. Breitenbach, Karlstein (DE); Jonathan Heywood, Hants (GB); Christian Sakowski, Hannover (DE); Christian Franke, Wolfsburg (DE); Manuel Baudoin, Newbury (GB); Farhad Riyahi, Oxon (GB)

(73) Assignee: NORMA GERMANY GMBH, Maintal (DE)

( * ) Notice: Subject to any disclaimer, the term of this patent is extended or adjusted under 35 U.S.C. 154(b) by 203 days.

(21) Appl. No.: 14/197,656

(22) Filed: Mar. 5, 2014

(65) Prior Publication Data
US 2014/0250638 A1 Sep. 11, 2014

(30) Foreign Application Priority Data

Mar. 6, 2013 (DE) .................. 10 2013 003 764

(51) Int. Cl.
*F16L 33/04* (2006.01)
*F16B 39/30* (2006.01)
*F16L 23/08* (2006.01)

(52) U.S. Cl.
CPC .............. *F16L 33/04* (2013.01); *F16B 39/30* (2013.01); *F16L 23/08* (2013.01); *Y10T 24/1441* (2015.01)

(58) Field of Classification Search
CPC ...................... F16B 39/30; Y10T 24/1441
See application file for complete search history.

(56) References Cited

U.S. PATENT DOCUMENTS 2,349,593 A * 5/1944 Hosking ............... F16B 35/005
411/311
3,118,479 A 1/1964 Crowther
(Continued)

FOREIGN PATENT DOCUMENTS

CN 1981138 6/2007
CN 101460774 6/2009
(Continued)

OTHER PUBLICATIONS

German Action conducted in counterpart German Appln. No. 10 2013 003 764.6 (Nov. 26, 2013) (w/ partial English language translation).
(Continued)

*Primary Examiner* — Robert J Sandy
*Assistant Examiner* — Matthew Sullivan
(74) *Attorney, Agent, or Firm* — Greenblum & Bernstein, P.L.C.

(57) ABSTRACT

Screw connection, in particular, a tension clamp, and method of forming the screw connection. The screw connection includes a screw having a screw head and an external thread with a thread turn profile and a thread axis, and a mating thread element having an internal thread, matched to the external thread, with at least one thread groove bordered by thread flanks to screwably receive the screw. A geometrically defined deformation of the external thread is arranged at a predetermined distance from the screw head to collide with at least one thread flank during the screwing of the screw into the mating thread element.

19 Claims, 2 Drawing Sheets

(56) References Cited

U.S. PATENT DOCUMENTS

| | | | |
|---|---|---|---|
| 3,731,725 A | 5/1973 | Brophy | |
| 4,905,353 A | 3/1990 | Gari | |
| 4,983,084 A * | 1/1991 | Gray | F16B 19/05 411/311 |
| 5,170,540 A * | 12/1992 | Oetiker | F16L 33/035 24/20 CW |
| 7,717,479 B2 | 5/2010 | Lebo et al. | |
| 8,038,376 B2 | 10/2011 | Jung et al. | |
| 8,181,314 B2 | 5/2012 | Mohlin et al. | |
| 2002/0131839 A1* | 9/2002 | Kondo | F16B 39/30 411/308 |
| 2004/0213646 A1* | 10/2004 | Jakuszeski | F16B 2/065 411/544 |
| 2007/0280803 A1* | 12/2007 | Pritchard | F16B 33/02 411/411 |
| 2008/0205974 A1* | 8/2008 | DiStasio | F16B 39/32 403/22 |
| 2008/0289076 A1* | 11/2008 | Millward | A43B 3/0078 2/69 |
| 2008/0292426 A1* | 11/2008 | Snow | F16B 19/05 411/258 |
| 2009/0100647 A1 | 4/2009 | Mohlin et al. | |
| 2009/0116929 A1* | 5/2009 | Shea | F16B 39/30 411/311 |
| 2009/0304478 A1 | 12/2009 | Jung et al. | |
| 2010/0162533 A1 | 7/2010 | Prevot et al. | |
| 2010/0172717 A1* | 7/2010 | Corbett | F16B 29/00 411/366.1 |
| 2012/0011702 A1* | 1/2012 | Pratt | F16B 5/04 29/525.02 |
| 2012/0034048 A1* | 2/2012 | Karupaya | B21H 3/027 411/402 |
| 2013/0039716 A1* | 2/2013 | McClure | F16B 13/06 411/80.1 |
| 2014/0201974 A1* | 7/2014 | Mitchell | F16B 19/1054 29/524.1 |

FOREIGN PATENT DOCUMENTS

| | | |
|---|---|---|
| DE | 18 24 544 | 1/1961 |
| DE | 19 14 477 | 1/1971 |
| DE | 3 011 820 | 10/1981 |
| DE | 10 2011 100 246 | 11/2012 |
| EP | 2131048 | 12/2009 |
| EP | 2 474 747 | 7/2012 |
| GB | 244 662 | 12/1925 |
| JP | 47-038927 | 10/1972 |
| JP | H08 326717 | 5/1995 |
| JP | 3031085 | 11/1996 |
| JP | 11-125230 | 5/1999 |
| JP | 2007-312798 | 12/2007 |
| JP | 2007-327535 | 12/2007 |
| JP | 2009-540229 | 11/2009 |
| JP | 2011-220493 | 11/2011 |
| KR | 200426315 | 9/2006 |
| KR | 2008-0053206 | 6/2008 |
| RU | 2 372 543 | 11/2009 |
| WO | 02/053926 | 7/2002 |

OTHER PUBLICATIONS

Korea Office Action conducted in counterpart Korea Appln. No. 10-2014-0023626 (Nov. 21, 2014) (w/ English translation).
Japanese Office Action conducted in counterpart Japan Appln. No. 2014-035860 (Feb. 3, 2015) (w/ English translation).
Russian Office Action conducted in counterpart Russia Appln. No. 2014104785/12 (Jan. 13, 2015) (w/ English translation).
China Office Action conducted in counterpart China Appln. No. 201410081104.X) (Mar. 10, 2016) (w/ English translation).
China Office Action conducted in counterpart China Appln. No. 201410081104 (Aug. 5, 2015) (w/ English translation).
Russia Office Action conducted in counterpart Russia Appln. No. 2014104785/12(007693) (Jun. 17, 2015) (w/ English translation).
Decision to Grant Patent conducted in counterpart Russia Appln. No. 2014104785/12(007693) (Dec. 29, 2015) (w/ English translation).
Europe Office Action conducted in counterpart Europe Appln. No. 14154605.1—1760) (May 10, 2017) (w/ partial English translation).

* cited by examiner

SCREW CONNECTION, IN PARTICULAR FOR A CLAMP, AND CLAMP

CROSS-REFERENCE TO RELATED APPLICATIONS

The present application claims priority under 35 U.S.C. §119 of German Patent Application No. 10 2013 003 764.6, filed Mar. 6, 2013, the disclosure of which is expressly incorporated by reference herein in its entirety.

BACKGROUND OF THE INVENTION

1. Field of the Invention

Embodiments of the invention relate to a screw connection, in particular for a clamp. The screw connection includes a screw having a screw head and an external thread with a thread turn profile and a thread axis, and with a mating thread element having an internal thread matched to the external thread. The internal thread has at least one thread groove bordered by thread flanks to be screwed into the screw.

Furthermore, embodiments relate to a clamp with an annularly embodied or formed clamp band which has two tensioning heads that are connected to one another by a screw connection. Embodiments are described below on the basis of a tension clamp. However, it can also be applied in other cases of application, e.g., for a profile clamp 2. Discussion of Background Information A profile clamp is used, for example, to mount a hose on a hose connection. The decrease in the inner diameter of the clamp band necessary herefor is produced in that the two tensioning heads are moved toward one another with the aid of the screw connection. For this purpose, the screw is typically guided through a tensioning head and screwed into the mating thread element which is arranged in the other tensioning head. By a turning of the screw in the mating thread element, the screw is moved more deeply into the mating thread element. Because the screw head bears against the other tensioning head, the two tensioning heads are moved toward one another in this manner.

A geometrically defined, and therefore reproducible, end mounting state of the overall system to be screwed together can be achieved in a simple manner if the two tensioning heads are brought to bear against one another. However, this is not possible or desired in all cases of application. In such cases, an additional component is often used, for example an intermediate element or a stop element, which produces an undefined force shunt. However, an additional component of this type makes mounting more complicated.

Although a simple limitation of the screwing motion of the screw into the mating thread element to a predetermined number of turns of the screw would possibly be able to produce the desired end mounting state, it can occur during changes in the overall system, for example due to a thermally induced setting behavior of a few components, such as the hose, that the screw connection loses the prestress thereof so that the screw independently loosens or even falls out during possible vibrations.

SUMMARY OF THE INVENTION

Embodiments of the invention achieve a geometrically reproducible end mounting state of a screw connection in a simple manner.

Accordingly, embodiments are directed to a screw connection of the type described at the outset in which the external thread has a geometrically defined deformation at a predetermined distance to the screw head. The deformation collides with at least one thread flank during the screwing of the screw into the mating thread element.

In embodiments of this type, the screw can simply be screwed into the mating thread element. Once the deformation reaches the mating thread element and collides with a thread flank, a further screwing of the screw into the mating thread element is no longer practically possible. The deformation of the external thread causes the external thread and the internal thread to no longer fit together in the region of the deformation. Because of the screwing motion of the screw into the mating thread element, however, the deformation is still turned somewhat into the internal thread so that here, in the simplest case, a jam between the screw and the mating thread element is produced which can be used as an additional protection against an inadvertent loosening of the screw from the mating thread element, for example by vibrations. When the deformation strikes a thread flank of the internal thread, then the torque necessary for a further turning of the screw increases. If a machine-operated tool is used for screwing in the screw, then this torque increase can be used to generate a signal which switches off the tool and interrupts the rotation motion. This is a clear signal to the worker that the desired end mounting state of the screw connection is achieved.

Preferably, the deformation has at least two deformation regions arranged in a circumferential direction in a distributed manner. The more deformation regions provided, the more precisely the end mounting state can be defined. With one deformation region, which is possible in principle, the variance up to the impact of the deformation on the threaded flank of the internal thread is one rotation, or 360°. With two deformation regions, one of the deformation regions strikes a thread flank of the internal thread with a variance of a 180° turn of the screw. With four deformation regions, the variance falls to 90° to produce the collision.

Preferably, at least two deformation regions are arranged in a diametrically opposing manner in relation to the thread axis. This facilitates production. It is possible to act on the external thread from two diametrically opposing sides in order to produce the deformation.

In a particularly preferred embodiment, it is provided that the deformation is embodied or formed as a shaping. Thus, the deformation is not produced by a machining deformation, but rather produced solely using shaping technology. In a shaping, no material is removed; rather, material is moved from one position to another position. It is thus possible, in a simple manner, to produce a situation in which the deformation can collide with the thread flank of the mating thread element during the screwing-in of the screw.

Here, it is preferred that the deformation is embodied or formed as a radial indentation of the thread turn profile. The thread turn profile is thus pressed radially inward and thereby moves partially in an axial direction, partially in a circumferential direction, respectively in relation to the thread axis. Because of this material movement, a shape of the thread turn profile is locally achieved which no longer fits together with the internal thread of the mating thread element so that a collision between the thread flank and the external thread is therefore inevitably achieved in the predetermined position.

Preferably, the external thread has a thread depth and the indentation has a radial depth which corresponds to at least 80% of the thread depth. The indentation can thus roughly correspond to the thread depth so that it is guided at least approximately up to the core of the screw. As a result, a sufficient resistance of the deformation is achieved.

Preferably, the deformation runs essentially parallel to a perpendicular line on the thread axis. In other words, the deformation runs essentially parallel to a tangent to the cross section of the outer circumference of the external thread. It is thus ensured that the deformation does not follow the thread pitch, but rather cuts the thread turn profile.

Preferably, the external thread has a pitch and the deformation has a width which correspond to at least 40% of the pitch. In other words, the width of the deformation is approximately or at least half of the pitch. The pitch is the distance by which the screw is moved into the thread element during a turn. Through the selection of the width, it is ensured that the deformation can reliably prevent a screwing of the screw into the mating thread element beyond the deformation.

Preferably, the external thread and the internal thread are connected to one another in the region of the deformation by a seizing up at at least one connection point. When the screw is screwed into the mating thread element with a certain rotation speed, a surface pressure can be produced upon impact of the deformation with the internal thread that is high enough that a cold welding occurs. This "seizing up," that is, the cold welding, is not reversible and offers a relatively large protection against an inadvertent loosening of the screw out of the mating thread element.

Here, it is particularly preferred that the screw and the mating thread element have, at least in the region of the external thread and internal thread, stainless steel. With stainless steel, it is possible to achieve a seizing up or cold welding of this type in a particularly reliable manner.

Preferably, the deformation is embodied or formed as a negative shape of a ridge. This allows a relatively simple production of the screw. The ridge merely needs to be pressed into the external thread at the predetermined distance to the screw head. The desired shaping is produced by this pressure.

Here, it is preferred that the negative shape has a rectangular, round, triangular or trapezoidal cross section. Through all these shapes, material is displaced out of the thread turn profile in a sufficient manner such that the external thread of the screw and the internal thread of the mating thread element no longer fit together and a further turning of the screw in the mating thread element is thus blocked.

According to embodiments, a clamp of the type named at the outset includes the screw connection embodied or formed as described above.

In this case, it is possible to ensure that the two tensioning heads have a predetermined distance to one another at the end of the mounting, that is, in the end mounting state, and therefore that an inner diameter of the clamp band is achieved which is matched to the desired installation situation.

Embodiments of the invention are directed to a screw connection. The screw connection includes a screw having a screw head and an external thread with a thread turn profile and a thread axis, and a mating thread element having an internal thread, matched to the external thread, with at least one thread groove bordered by thread flanks to screwably receive the screw. A geometrically defined deformation of the external thread is arranged at a predetermined distance from the screw head to collide with at least one thread flank during the screwing of the screw into the mating thread element.

According to embodiments, the screw connection can be structured and arranged as a tension clamp.

In accordance with other embodiments, the deformation may have at least two deformation regions arranged in a circumferential direction in a distributed manner. The at least two deformation regions are arranged to diametrically oppose each other in relation to the thread axis.

According to other embodiments of the invention, the deformation may be embodied as a shaping. The shaping can be formed as a radial indentation of at least one thread turn profile. The external thread has a predefined thread depth and the radial indentation has a radial depth of at least 80% of the thread depth.

In other embodiments, the deformation can essentially run parallel to a line perpendicular to the thread axis.

In still other embodiments of the invention, the external thread has a predefined pitch and the deformation has a width of at least 40% of the pitch.

According to still other embodiments, the external thread and the internal thread may be connected to one another by seizing up at at least one connection point in a region of the deformation. The mating thread element can have a lead-in region on the internal thread and the connection point can be arranged in the lead-in region. Further, the screw and the mating thread element may include, at least in a region of the external thread and internal thread, stainless steel.

In other embodiments, the deformation may be embodied as a negative shape of a ridge. The negative shape can have one of a rectangular, round, oval, triangular, polygonal or trapezoidal cross section.

Embodiments of the invention are directed to a tension clamp that includes an annularly embodied clamp band having has two tensioning heads. The two tensioning heads are connectable to one another by the above-described screw connection.

According to embodiments of the invention, only one of the two tensioning heads includes the mating thread element.

In accordance with other embodiments, the deformation may include a plurality of depression regions arranged at the predetermined distance from the screw head and circumferentially spaced from each other.

Moreover, the deformation at the predetermined distance from the screw head can prevent the two tensioning heads from contacting each other during a screwing of the screw into the mating thread element.

Embodiments of the invention are directed to a method of forming a screw connection. The method includes forming a deformation in at least one deformation region of an external thread of a screw located at a predetermined distance from a screw head of the screw, and screwing the screw into a mating thread element having an internal thread that matches the external thread until thread flanks of the internal thread collide with the deformation.

In accordance with still yet other embodiments of the present invention, the at least one deformation region can include a plurality of deformation regions located at the predetermined distance from the screw head and circumferentially spaced from each other.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
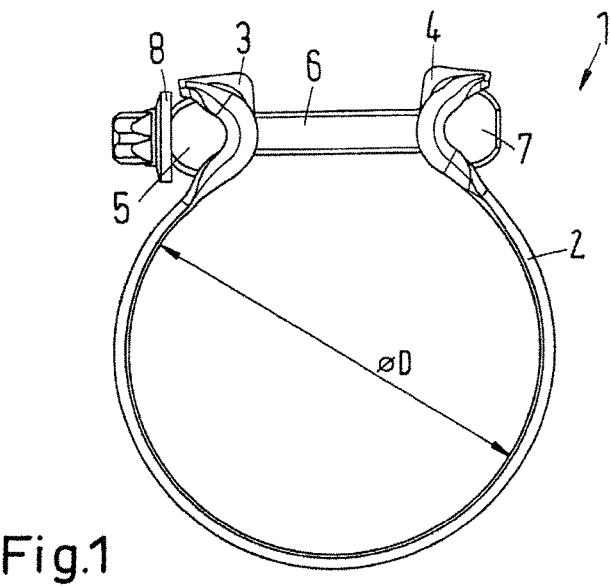
FIG. 1 shows a schematic representation of a tension clamp.

FIG. 1 schematically shows a tension clamp 1 with an annularly embodied or formed clamp band 2 which is provided with tensioning heads 3, 4 at the two ends thereof. Tensioning heads 3, 4 do not necessarily need to be arranged exactly at the ends of clamp band 2.

Tensioning head 3 has a cylinder bolt 5 with a pass-through hole through which a screw 6 is guided. The screw 6 can move freely in cylinder bolt 5. Screw 6 is screwed into a mating thread element 7 which is arranged in the second tensioning head 4. Screw 6 has a screw head 8 which bears against the cylinder bolt 5. A connection of this type with tensioning heads 3, 4 is, of course, also possible with a different clamp, e.g., a profile clamp.

Clamp band 2 has an inner diameter D. When screw 6 is screwed into mating thread element 7, then two tensioning heads 3, 4 are moved toward one another. As a result, inner diameter D decreases.

Figure 2:
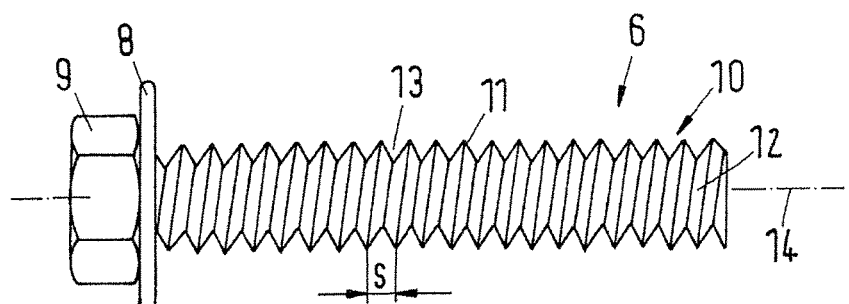
FIG. 2 shows a schematic representation of a screw with a standard thread.

FIG. 2 shows screw 6 in an enlarged representation. Screw head 8 has a torsional contact surface 9, e.g., in the shape of an external hex. In addition, screw 6 has an external thread 10. External thread 10 has a thread turn profile 11 which, in the present case, is embodied or formed as a helically circumferential, triangular raised edge which runs around a screw core 12. Thread grooves 13 are embodied or formed between individual threads of thread turn profile 11. In most cases, external thread 10 is embodied or formed in a single-threaded manner. However, it can also be embodied or formed in a multi-threaded manner. Furthermore, screw 6 has a thread axis 14 about which screw 6 is turned when screw 6 is screwed into mating thread element 7.

External thread 10 has a pitch s which corresponds to a distance between two peaks of thread turn profile 11. Pitch s is the distance by which screw 6 is moved into mating thread element 7 during a turn.

Figure 3:
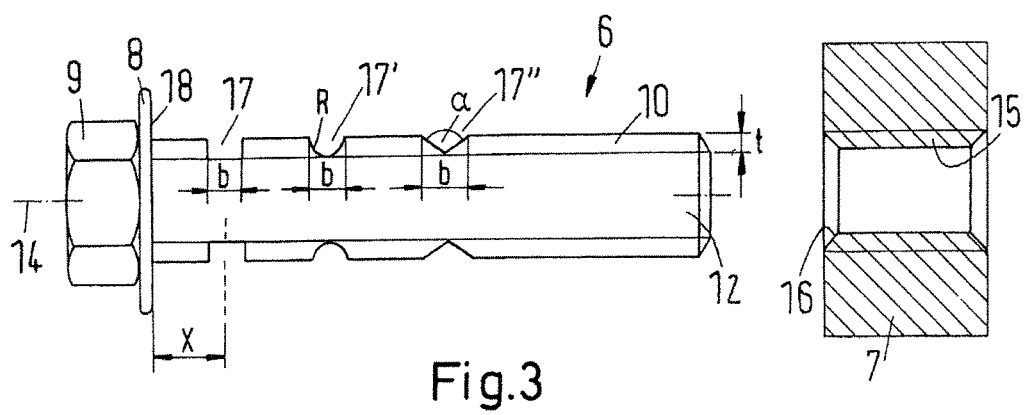
FIG. 3 shows a conventional well known mating thread elements 7 and a screw with multiple examples of a deformation and a mating thread element.

FIG. 3 shows screw 6 once more in schematic form with further details. It can be recognized that external thread 10 has a thread depth t. Expressed simply, thread depth t is the distance between the outer circumference of screw core 12 and the outer circumference of thread turn profile 11.

Mating thread element 7 has an internal thread 15 in a corresponding manner. Internal thread 15 is matched to external thread 10, i.e., it has the same pitch s and the same nominal thread diameter. In a conventional and well known manner, and therefore not illustrated in greater detail, internal thread 15 has a helically led thread groove which is bordered by thread flanks. Furthermore, internal thread 15 has, at least at the end thereof facing screw 6, a lead-in region 16. Here, lead-in region 16 is embodied or formed somewhat conically. In lead-in region 16, the depth of the thread groove of internal thread 15 gradually increases. The length of lead-in region 16 parallel to thread axis 15 is often one to three times pitch s.

In many cases, it is desired to achieve a decrease of inner diameter D of clamp band 2 to a predetermined value at which two tensioning heads 3, 4 have not yet come to bear against one another.

In order to achieve a geometrically defined, and therefore reproducible, end mounting state of the overall system of clamp band 2, tensioning heads 3, 4, screw 6 and mating thread element 7 in this case, screw 6 illustrated in FIG. 2 has been modified, as this can be seen from FIG. 3.

Screw 6 has a geometrically defined deformation 17 at a predetermined distance x from screw head 8.

In FIG. 3, three deformations 17, 17', 17" are illustrated along screw axis 14. This representation was chosen for reasons of simplicity in order to show different shapes for alternative deformations 17, 17' or 17". In actuality, a screw 6 of this type only has a single deformation 17, 17' or 17".

Figure 4:
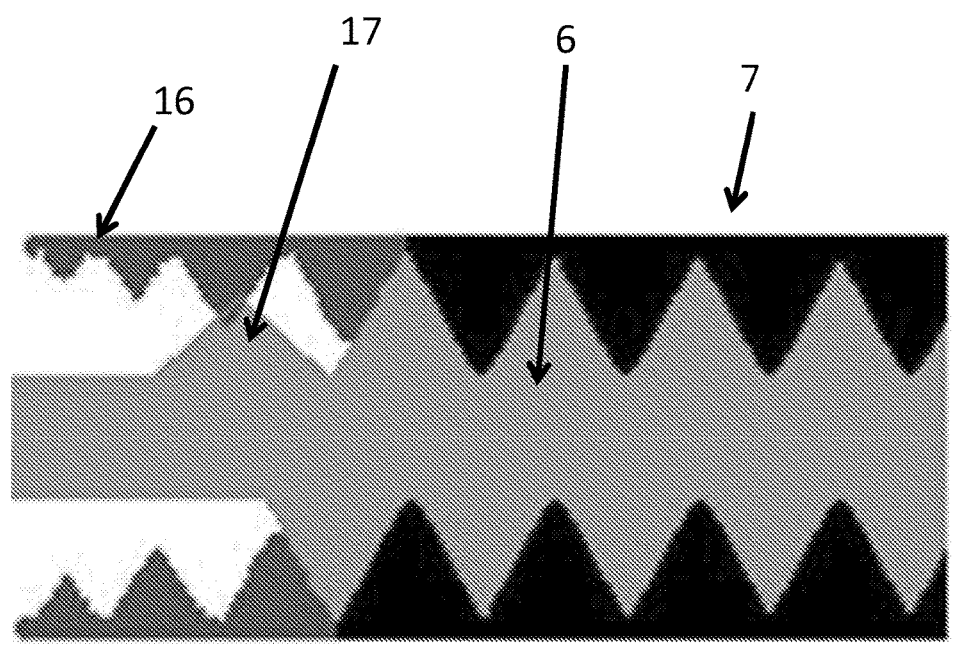
FIG. 4 shows a detailed schematic of the thread deformation and the lead in region

Deformation 17, 17' or 17" is produced by a shaping of thread turn profile 11 of external thread 10, i.e., not by a shape cutting. In a shaping of this type, a part of thread turn profile 11 is displaced and moved into a different position in a circumferential and possibly also in an axial direction so that external thread 10 no longer fits together with internal thread 15 in the region of deformation 17, 17' or 17". Thus, screw 6 can only be screwed further into mating thread element 7 until deformation 17, 17' or 17" reaches lead-in region 16 of internal thread 15 and collides with one or multiple thread flanks of internal thread 15 there. This is shown in FIG. 4.

This collision has at least two consequences. On the one hand, a further screwing of screw 6 into mating thread element 7 is no longer possible. Deformation 17, 17' or 17" blocks a further rotation. On the other hand, deformation 17, 17' or 17" wedges or jams itself in internal thread 15 so that it can only be loosed with difficulty or, in many cases, not at all.

This applies in particular if screw 6 is screwed into mating thread element 7 using a motor-operated tool, such as a screw gun. In this case, deformation 17, 17', or 17" strikes the thread flanks of the internal thread 15 with a certain speed so that a considerable surface pressure results before the rotation motion of the screw 6 has fully ceased.

In a particularly preferred embodiment, screw 6 and mating thread element 7 are formed from stainless steel, in any case at least in the region of external thread 10 and internal thread 15. In this context, stainless steel has the advantage that it tends toward a "seizing up," i.e., there results a sort of cold welding in which a materially bonded connection, a friction fit and a form fit between screw 6 and mating thread element 7 are produced which can no longer be loosened by vibrations. Screw 6 is thus held secured against loss in mating thread element 7. The "seizing up" produces a connection point which is preferably located in lead-in region 16. Even if the deformation 17, 17' or 17" only jams in the internal thread, this occurs preferably in lead-in region 16.

As mentioned above, screw 6 opposes a rotation motion with an increased resistance when deformation 17, 17' or 17" has been screwed far enough into lead-in region 16 of internal thread 15 and the rotation motion should thus cease, since the geometrically desired end mounting state is achieved. With a motor-operated screwing tool, this resistance increase can be measured in order to generate a signal that ends the further turning of screw 6 by the motor-operated tool. This is a clear signal to the worker that screw 6 has been screwed far enough into mating thread element 7.

In principle, it is sufficient if deformation 17, 17' or 17" has a deformation region which is arranged at predetermined distance x. Here, the predetermined distance x refers to the distance between the middle of deformation 17, 17' or 17" parallel to screw axis 14 and a stop face 18 on screw head 8.

However, it is advantageous in many cases if deformation 17, 17' or 17" has at least two deformation regions, as is illustrated in FIG. 3. With one deformation region in a circumferential direction, a blocking of the rotation motion of screw 6 in mating thread element 7 occurs at some time during a complete turn. With two deformation regions, only a half-turn is still needed to produce a blocking of the rotation motion. Accordingly, with four deformations 17, 17' or 17", only a 90° turn is still necessary before a blocking occurs.

Expediently, two deformation regions of deformation 17, 17' or 17" are arranged in a diametrically opposing manner in relation to thread axis 14.

In this case, it is for example possible to press respectively one ridge into external thread 10 from the two diametrically opposing sides using a press in order to produce deformation 17, 17' or 17" in a geometrically defined manner by shaping thread turn profile 11.

The deformation 17, 17' or 17" is, as illustrated in FIG. 3, embodied or formed as a radial indentation of or in thread turn profile 11. Deformation 17, 17' or 17" thereby essentially runs parallel to a perpendicular line on the thread axis and parallel to a tangent to a cross section of the envelopes of external thread 10. Because thread turn profile 11 runs to the tangent with a particular pitch, it is thus ensured that deformation 17, 17' or 17" in a way "cuts" a part of thread turn profile 11 so that it is ensured with considerable reliability that external thread 10 no longer fits with internal thread 15.

The indentation roughly corresponds to thread depth t, that is, it corresponds to approximately half of the difference between the outer diameter of external thread 10 and the outer diameter of screw core 12. The radial depth of deformation 17, 17' or 17" can also be somewhat smaller. However, it should be at least 80% of thread depth t.

deformation 17, 17' or 17" has a width b which corresponds to at least approximately half of pitch s. It can also be somewhat smaller, but should be at least 40% of pitch s. Width b can also be larger and even be a multiple of pitch s.

As explained above, deformation 17, 17' or 17" is embodied or formed as a negative form of a ridge which is produced in that the ridge is pressed into external thread 10. Deformation 17, 17' or 17" is thus geometrically defined.

As can be seen in FIG. 3, this negative form can have different cross sections. For example, deformation 17 has a roughly rectangular cross section. Deformation 17' has a round, in particular circular, cross section, the radius of which is R. Deformation 17" has a triangular cross section with an angle a, which is preferably embodied or formed as an obtuse angle or as an angle which differs from the flank angle of external thread 10. Alternatively, a trapezoidal or trapezium-shaped cross section shape can also be used. Other cross section shapes, such as oval or polygonal, are possible.

With a deformation 17 (or 17' or 17") of this type, screw 6 can only be screwed into mating thread element 7 up to a certain depth. This depth is determined by distance x between deformation 17, 17' or 17" and stop face 18 of screw head 8. Once deformation 17, 17' or 17" strikes the flanks of internal thread 15, a further rotation motion of screw 6 in mating thread element 7 is no longer possible and, furthermore, a jamming or even a "seizing up" results so that screw 6 is held in mating thread element 7 with a "loss protection."

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A screw connection comprising:
    a screw having a screw head and an external thread with a thread turn profile and a thread axis;
    a mating thread element having an internal thread, matched to the external thread, with at least one thread groove bordered by thread flanks to screwably receive the screw; and
    a geometrically defined deformation of the external thread being arranged at a predetermined distance from the screw head to collide with at least one thread flank during the screwing of the screw into the mating thread element,
    wherein the external thread and the internal thread are connected to one another by seizing up at at least one connection point in a region of the deformation, and
    wherein the mating thread element has a lead-in region on the internal thread in which a depth of the thread groove of the internal thread gradually increases in an insertion direction and the connection point is arranged in the lead-in region,
    wherein a length of the lead-in region is one to three times a thread pitch length.

2. The screw connection according to claim 1, wherein the screw connection is structured and arranged as a tension clamp.

3. The screw connection according to claim 1, wherein the deformation has at least two deformation regions arranged in a circumferential direction in a distributed manner.

4. The screw connection according to claim 3, wherein the at least two deformation regions are arranged to diametrically oppose each other in relation to the thread axis.

5. The screw connection according to claim 1, wherein the deformation is embodied as a shaping.

6. The screw connection according to claim 5, wherein the shaping is formed as a radial indentation of at least one thread turn profile.

7. The screw connection according to claim 6, wherein the external thread has a predefined thread depth and the radial indentation has a radial depth of at least 80% of the thread depth.

8. The screw connection according to claim 1, wherein the external thread has a predefined pitch and the deformation has a width of at least 40% of the pitch.

9. The screw connection according to claim 1, wherein the screw and the mating thread element comprise, at least in a region of the external thread and internal thread, stainless steel.

10. The screw connection according to claim 1, wherein the deformation is embodied as a negative shape of a ridge.

11. The screw connection according to claim 10, wherein the negative shape has one of a rectangular, round, oval, triangular, polygonal or trapezoidal cross section.

12. A tension clamp comprising:
an annularly embodied clamp band having has two tensioning heads,
wherein the two tensioning heads are connectable to one another by the screw connection according to claim 1.

13. The tension clamp according to claim 12, wherein only one of the two tensioning heads comprises the mating thread element.

14. The tension clamp according to claim 12, wherein the deformation comprises a plurality of depression regions arranged at the predetermined distance from the screw head and circumferentially spaced from each other.

15. The tension clamp according to claim 12, wherein the deformation at the predetermined distance from the screw head prevents the two tensioning heads from contacting each other during a screwing of the screw into the mating thread element.

16. A method of forming a screw connection, comprising:
forming a deformation in at least one deformation region of an external thread of a screw located at a predetermined distance from a screw head of the screw; and
screwing the screw into a mating thread element having an internal thread that matches the external thread so that the external thread and the internal thread are connected to one another until seizing up at at least one location in a region of the deformation,
wherein the mating thread element has a lead-in region on the internal thread in which the depth of the thread groove of the internal thread gradually increases in the insertion direction and the connection point is arranged in the lead-in region, and
wherein a length of the lead-in region is one to three times a thread pitch length.

17. The method according to claim 16, wherein the at least one deformation region comprises a plurality of deformation regions located at the predetermined distance from the screw head and circumferentially spaced from each other.

18. The screw connection according to claim 1, wherein the deformation extends in a direction parallel to a line perpendicular to the thread axis.

19. The method according to claim 16, wherein the deformation extends in a direction parallel to a line perpendicular to the thread axis.

* * * * *